United States Patent
Garakani

(10) Patent No.: US 7,587,637 B2
(45) Date of Patent: Sep. 8, 2009

(54) SYSTEM AND METHOD FOR TESTING HUMAN INTERACTIVE APPLICATIONS INCLUDING COMPUTER GAMES

(75) Inventor: Behrang Garakani, San Leandro, CA (US)

(73) Assignee: Electronic Arts, Inc., Redwood City, CA (US)

( * ) Notice: Subject to any disclaimer, the term of this patent is extended or adjusted under 35 U.S.C. 154(b) by 442 days.

(21) Appl. No.: 11/123,722

(22) Filed: May 6, 2005

(65) Prior Publication Data

US 2006/0253741 A1 Nov. 9, 2006

Related U.S. Application Data

(63) Continuation-in-part of application No. PCT/US2004/035185, filed on Oct. 22, 2004.

(60) Provisional application No. 60/514,221, filed on Oct. 24, 2003.

(51) Int. Cl.
*G06F 11/00* (2006.01)

(52) U.S. Cl. ......................................................... 714/37
(58) Field of Classification Search .................... 714/37
See application file for complete search history.

(56) References Cited

U.S. PATENT DOCUMENTS

| 6,067,638 | A | * | 5/2000 | Benitz et al. ................... 714/37 |
| 6,230,121 | B1 | | 5/2001 | Weber |
| 6,587,969 | B1 | * | 7/2003 | Weinberg et al. .............. 714/46 |
| 6,865,692 | B2 | * | 3/2005 | Friedman et al. .............. 714/25 |
| 2003/0229825 | A1 | * | 12/2003 | Barry et al. ................... 714/38 |
| 2006/0253741 | A1 | * | 11/2006 | Garakani ...................... 714/38 |

* cited by examiner

*Primary Examiner*—Emerson C Puente
(74) *Attorney, Agent, or Firm*—Philip H. Albert; Townsend and Townsend and Crew, LLP

(57) ABSTRACT

An interactive application testing system allows a human tester to operate an interactive application and record user inputs and outputs for later replay for a debugger. By synchronizing recordation of inputs and outputs, testing sessions can be easily replayed. Where the tester is a human user, a test session can be dynamic and respond to human user feedback of game events.

22 Claims, 2 Drawing Sheets

SYSTEM AND METHOD FOR TESTING HUMAN INTERACTIVE APPLICATIONS INCLUDING COMPUTER GAMES

CROSS-REFERENCE TO RELATED APPLICATIONS

The present application is a continuation-in-part of International Application No. PCT/US04/035185, filed Oct. 22, 2004, which claims priority to U.S. Provisional Application No. 60/514,221 filed Oct. 24, 2003. The respective disclosures of those applications are incorporated herein by reference in their entirety for all purposes.

FIELD OF THE INVENTION

The present invention relates to devices, systems and methods for testing interactive applications in general and more particularly to testing through a human testing user's interaction with the interactive applications and recording operations to recreate an error condition encountered by the human testing user for analysis by a debugger.

BACKGROUND OF THE INVENTION

Interactive computer games and other interactive applications might be implemented as computers, consoles, or other computing device coupled to a display with user input devices such as console controllers, keyboards, and the like. As applications can be complex, they need to be tested and often that involves a tester using the applications and noting any bugs.

Often, testing involves automated scripting, wherein a testing apparatus executes preprogrammed sequences of providing inputs to the machine under test and the results are noted, either programmatically or by a human observer. Often, this is not sufficient for testing, as the generation of preprogrammed sequences sufficient to test many aspects of an application can be almost as complicated as creating the application.

Software testing devices for quality assurance, quality control and debugging are well known in the software fields. Human interactive applications and devices are more difficult to test. Examples include video games, vehicle simulators, and other systems and devices configured to operate and respond to human interaction.

One method of testing, such as with video games, is to have a human user play the video game device while the output shown to the user is recorded on a video recorder while the game is played. These recordings may be digital or analog video recordings. If a problem (program bug, undesirable or notable application event) occurs, the video recording can be reviewed by a testing person. A developer then uses the recording to determine how the application might have erred and then might perform additional testing to recreate the error condition in order to begin a debugging process. This is a very labor intensive and inexact method of testing and debugging such applications and devices where most problems are not reproducible.

Another conventional method that may aid in testing is use of debug logs. Such logs are sometimes used on computer systems to record the occurrences of certain predetermined system failures as they occur. Entries in the logs may indicate certain failures in the system, and are typically used for routine system troubleshooting and maintenance. The logs may then be reviewed by programmers trying to troubleshoot a system or simply monitor the activities of a system. Debug logging typically requires coding in debug points such that when a debug point is encountered in program code, a debug entry is written to a log. Thus, this requires advanced decision as to where to place debug points. Erring on the side of too many debug points might render the debug log too cumbersome, while erring on the side of too few debug points might render the debug log uninformative.

BRIEF SUMMARY OF THE INVENTION

An interactive application testing system according to embodiments of the present invention allows a human tester to operate an interactive application and record user inputs and outputs for later replay for a debugger. By synchronizing recordation of inputs and outputs, testing sessions can be easily replayed. Where the tester is a human user, a test session can be dynamic and respond to human user feedback of game events.

The following detailed description together with the accompanying drawings will provide a better understanding of the nature and advantages of the present invention.

DETAILED DESCRIPTION OF THE INVENTION

An improved testing system is described herein. In one aspect, a testing apparatus is interposed between user input devices and user output devices and the testing apparatus records what a human testing user does with the user input devices and what the user obtains with the user output devices. Additional recording might be done of control outputs, to allow for improved reconstruction of what happened as the test was performed. The human user can operate the application in an unscripted manner, possibly responsive to outputs of the application, to test the application as the user feels is appropriate.

In exemplary embodiments, a system for testing human interactive devices is provided including a testing apparatus that can send and receive signals between the testing apparatus and a device executing the application being tested and to send and receive signals between the testing apparatus and any I/O elements. The system further comprises either direct storage, or an interface to a storage device, configured to store information pertaining to signals transmitted to and from the testing apparatus. The stored information may include additional information beyond just the signals, such as time stamps or other time references for when the signals were recorded.

Examples as relate to testing a game application will now be described. In operation, the system includes a method of testing a game device during a session of game operation by a human user, where the steps include receiving and storing a session of operational game input and output data according to a time reference, receiving and storing a session of an interactive device input and output data according to the time reference, and reproducing the session by replaying the stored inputs and outputs according to the time reference. Reproducing the session may include playing back the input and output data in a synchronized manner. Play back might be done frame by frame, so that inputs and/or outputs can be replayed a frame at a time. Recording is typically done transparently, but the human testing user might be provided with controls to control the recording process and/or to observe a state of recording.

In operation of game programs, "random" events may occur, which are events that are not necessarily determined by user inputs but can be affected by random or pseudorandom calculations performed by the game program. The particular event is typically determined by seed values, such as a value at a system clock or a random number generator.

Figure 1:
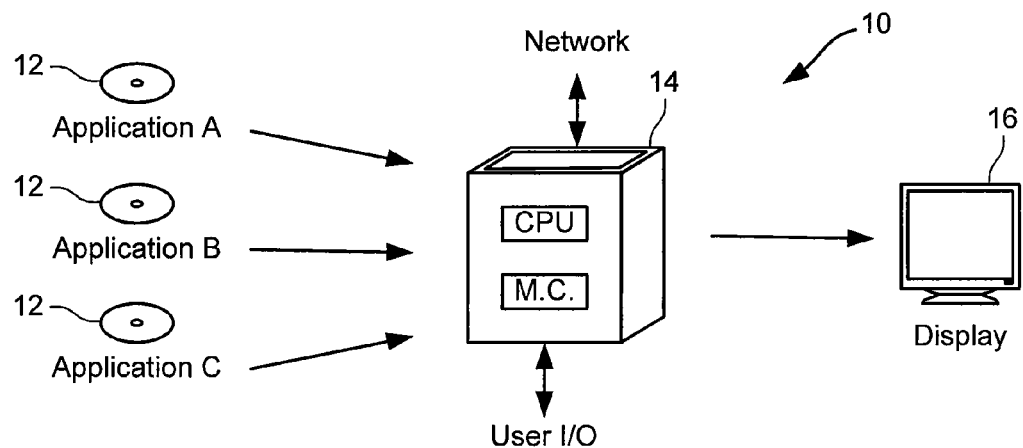
FIG. 1 illustrates a game system for providing one or more applications as might be tested.

FIG. 1 illustrates a system 10 for providing one or more applications for a user according to embodiments of the present invention, which applications need to be tested in their intended environment. Some of these applications can be computer games, such as sports games, role playing games, character development games, exploration games, combat games, or the like. System 10 is shown including one or more application media 12 (application A, application B, application C), a device 14 for executing the applications, and a display 16. System 10 might also include other input and output devices not shown, such as audio output devices.

One or more application media 12 can include any applications that may be used by device 14 to involve a user in an application. Each application medium 12 includes logic to provide an application, denoted as application A, application B, and application C. In one embodiment, the application provided by device 14 is an electronic video game. Applications might be each individually stored on media, such as compact disk read-only memories (CDROMs), digital versatile disks (DVDs), cartridges, or other storage media, or they might be combined. In testing, the applications might be stored in read/writable storage. Some applications might also be included integrated in with device 14.

Device 14 is a computing device that includes a processor, such as a CPU, and data storage combined or in separate elements. Device 14 may be connected to a network that allows device 14 to provide applications that are not included on one or more application media 12.

An application may be also referred to as an application code and/or an application program. An application should be understood to include software code that device 14 uses to provide an application for a user to operate. An application might comprise software code that informs device 14 of processor instructions to execute, but might also include data used in the operation of the application, such as data relating to constants, images and other data structures created by the application developer including predefined input sequences and their corresponding application actions. A user interacts with the application and device 14 through user input/output (I/O) devices, some of which are described in more detail below.

Figure 2:
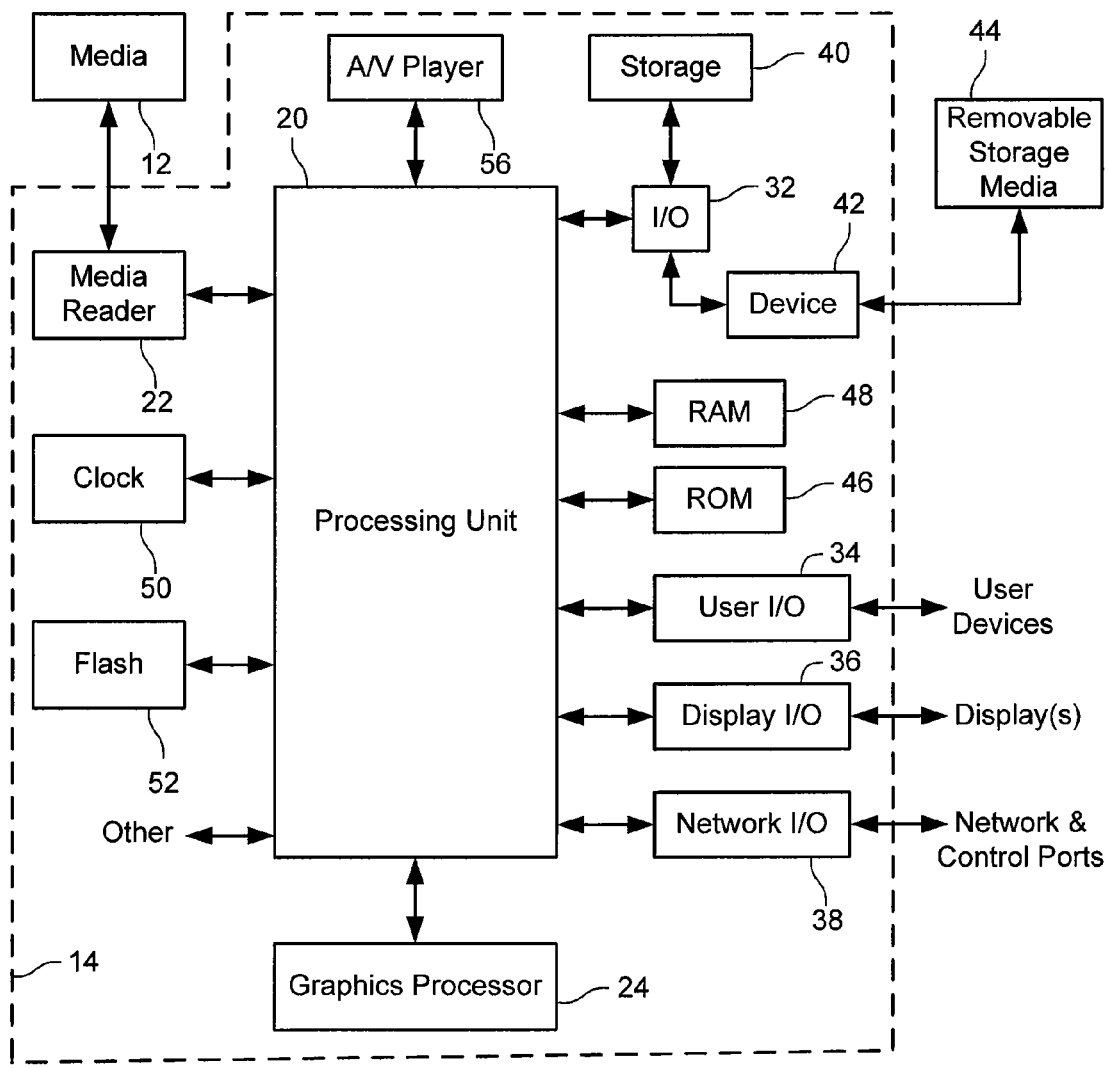
FIG. 2 illustrates an embodiment of a device according to the present invention that forms part of the system shown in FIG. 1.

FIG. 2 illustrates an embodiment of device 14 according to the present invention. It should be understood that other variations of device 14 may be substituted for the examples explicitly presented herein and may be appreciated by a person of skill in the art. As shown, device 14 includes a processing unit 20 that interacts with other components of device 14 and also external components to device 14. An application media reader 22 is included that communicates with application media 12. Application media reader 22 may be a CDROM or DVD unit that reads a CDROM, DVD, or any other reader that can receive and read data from application media 12.

Device 14 might include a separate graphics processor 24. Device 14 also includes various components for enabling input/output, such as an I/O 32, a user I/O 34, a display I/O 36, and a network I/O 38. I/O 32 interacts with storage element 40 and, through a device 42, removable storage media 44 in order to provide storage for device 14. Processing unit 20 communicates through I/O 32 to store data, such as application state data and any shared data files. In addition to storage 40 and removable storage media 26, device 14 is also shown including ROM (read-only memory) 46 and RAM (random access memory) 48. Device 14 also includes other features such as a clock 50, flash memory 52, and other components. An audio/video player 56 might also be used to play a video sequence such as a movie. It should be understood that other components may be provided in device 14 and that a person skilled in the art will appreciate other variations of device 14.

Program code might be stored in ROM 46, RAM 48 or storage 40 (which might comprise hard disk, other magnetic storage, optical storage, other storage or a combination or variation of these. In a common arrangement, part of the program code is stored in ROM that is programmable (ROM, PROM, EPROM, EEPROM, etc.) and part of the program code is stored on removable media such as application media 12 (which can be a CD-ROM, cartridge, memory chip or the like, or obtained over a network or other electronic channel as needed). In general, program code can be found embodied in a tangible signal-bearing medium.

RAM 48 (and possibly other storage) is usable to store variables and other application and processor data as needed. Typically, RAM is used and holds data that is generated during the operation of the application and portions thereof might also be reserved for frame buffers, application state and/or other data needed or usable for interpreting user input and generating application displays.

Figure 3:
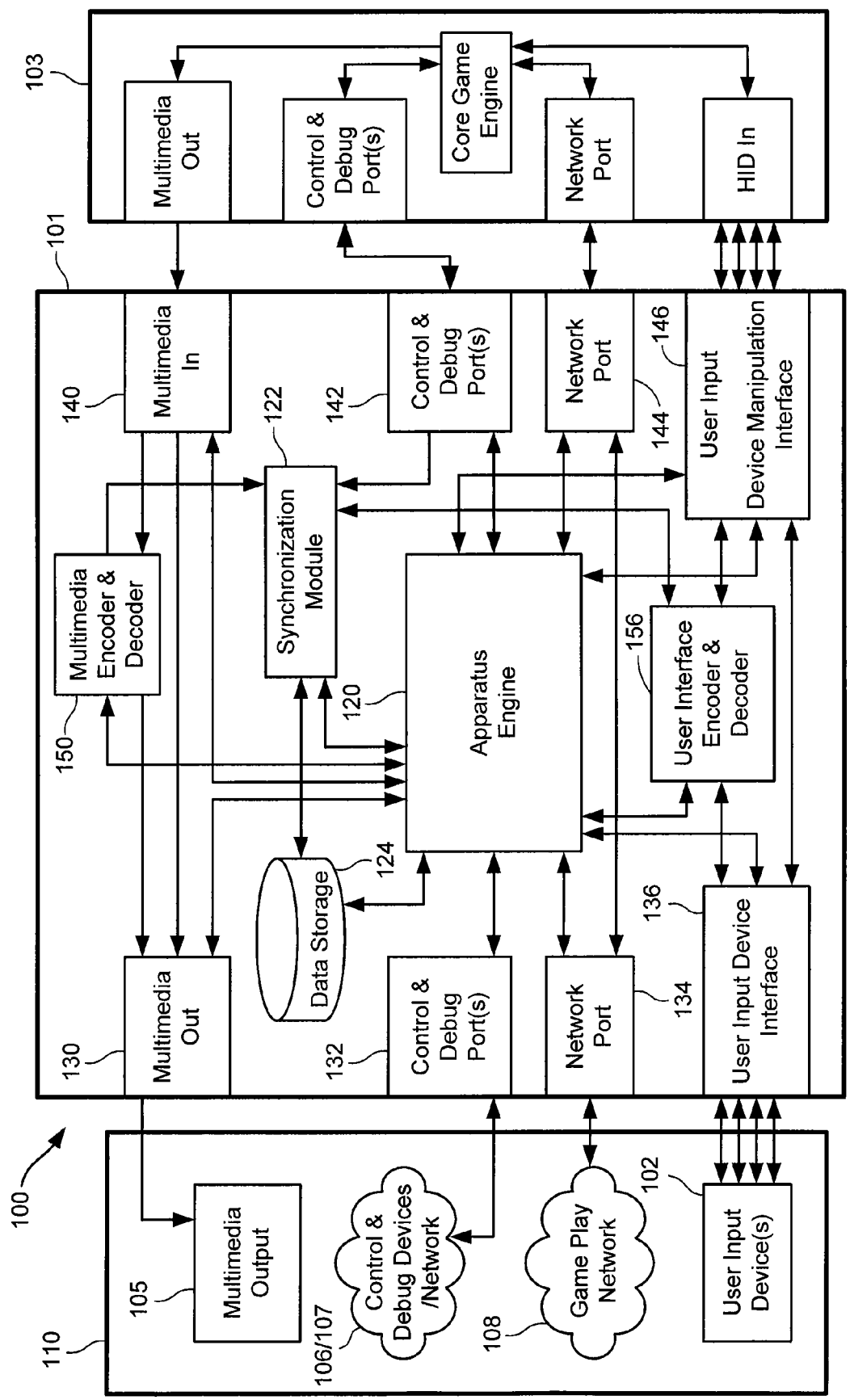
FIG. 3 illustrates placement of a testing apparatus and its various components.

Referring to FIG. 3, one embodiment of a system 100 is illustrated. System 100 includes a testing apparatus 101 interposed between user input devices 102, networks 106/107/108 and output devices 105 on one hand (collectively "I/O devices" 110) and a device under test 103 on the other hand, wherein device under test 103 is preferably the device that would be used to run the application under test in operating environment. In a non-test environment, the application would run on a device similar to device under test 103 and obtain its inputs from, and provide its outputs to, I/O devices 110 directly. Although not shown, testing apparatus 101 might include elements similar to those shown in FIG. 2 as details mentioned for device under test 103.

User input devices 102 might comprise keyboards, mice, joysticks, game pads, and the like. Device under test 103 can be a desktop computer, a game console or the like. Some well-known game consoles include Sony's Playstation™ products, Microsoft's Xbox™ products and Nintendo's Game Cube™ products. Others include various flight simulators, cell phones having game capability and the like. Device under test 103 might also be running other software or hardware that is not under test.

FIG. 3 also shows various components of an example testing apparatus, such as an apparatus engine 120, synchronization module 122, data storage 124, various user interfaces (multimedia output 130, control and debug I/O 132, network port 134, and user input device interface 136) and device interfaces (multimedia port 140, control and debug I/O 142, network port 144 and user input device controller manipulation interface 146). Also shown are a multimedia encoder and decoder 150 and a user interface encoder and decoder 156).

In a testing operation, the human testing user would manipulate the user input devices to put a game through its paces while observing results based on multimedia output on output devices 105 as testing apparatus 101 interfaces to external networks as appropriate for the game. The multimedia that is output by testing apparatus 101 and a test mode is driven by the multimedia outputs of device under test 103 as received by multimedia port 140. The user input device manipulation done by user input device manipulation interface 146 during testing mode corresponds to inputs provided through user input device interface 136 and during a debugging mode by apparatus engine 120. During testing mode, synchronization module 122 coordinates synchronizing the various input and output signals and providing those to apparatus engine 120 for storage in data storage 124 or for direct storage in data storage 124.

Apparatus engine 120 is coupled to each of the elements of testing apparatus 101 as shown, however indirect connections might also be possible. Synchronization module 122 is shown coupled to multimedia encoder and decoder 150, user interface encoder decoder 156, control and debug I/O 142, data storage 124 and apparatus engine 120. Other connections might be provided as needed. Multimedia can comprise audio, video, touch and/or other sensory output. The audio could be single channel or multi-channel.

Control and Debug Devices/Network 106/107 might be provided for handling data output from testing apparatus that comprises control output from the testing apparatus or control output passed through from device under test 103. This network might also be used to control testing apparatus 101, such as to tell it to start and stop recording, execute a playback process, dump data, setting states within device under test 103, to the extent possible, etc. Testing apparatus inputs might also include debug level settings, random seed generator settings, etc. Related operations include initializing a recording session of a test, managing recording data files, and playing back previously recorded data. In one embodiment, a debug output monitor and a debug input device may be coupled to the control and debug ports. If these inputs are used to modify game play, they might be recorded with time references and stored along with time-referenced game data.

Apparatus engine 120 can be configured to operate as a user interface to set the multimedia encoder and decoder levels, human input device encoder and decoder levels, the type of devices being used, game boards or other controllers being used, the type of video being handled (HDTV, PAL, NTSC, etc.), the type of audio being handled (for example, mono, Dolby™, stereo, Surround Sound™, THX™, etc.) and the like.

Synchronized Data Format

In one embodiment, synchronized module 122 formats the data to be recorded such that it is synchronized, i.e., changing data is stored with time reference, such as timestamps, so that the time of recording the changing data can be determined. The data recorded can include multimedia output data, inputs from I/O devices 110, including network traffic generated by, or sent to, device under test 103, debug output generated by device under test 103 and control data sent to device under test 103.

The synchronized data can be used for playback to get a game (or other application) to a point of interest, such as a point in time that a human testing user determined would be a point of interest such as a point at which an error occurred in the game play. The synchronized data might be stored external to testing apparatus 101 if sufficient storage in data storage 124 is not available or additional analysis is needed that cannot be provided by testing apparatus 101.

The synchronized data can be stored as a series of snapshots taken as a unit periodically, such as being stored once per frame. For example, where the multimedia video output is 60 frames per second, a snapshot might be stored each 1/60th of a second. The manner of storage can be controlled using a control port input to testing apparatus 101.

In a testing operation, inputs and outputs that are received and sent by the device under test 103 are decoded by the various decoding modules such as multimedia encoder and decoder 150 and the user interface device encoder and decoder 156 and saved as synchronized data using synchronization module 122. The recording may compressed to only save state changes as opposed to samples for each frame.

The signals from I/O device 110 are sent between testing apparatus 101 and in addition to recording them, testing apparatus 101 would pass through the signals to device under test 103. The audio/visual/touch/etc. output from device under test 103 is sent to testing apparatus 101, where it is recorded and sent transparently to multimedia output 130. The interface device signals and the audio/visual output from device under test 103 are stored synchronized together.

Network information received from the network 108 destined for the device under test 103 or transmitted from the device under test 103 and destined for the network 108 can be decoded by testing apparatus 101 and saved as part of the recorded synchronized data.

In one embodiment, the control and debug port information are saved. Also, there may exist state information that needs to be set for the recording to playback properly, including generation of the random seed, and this information may be preserved by the system as well. Debug messages may be preserved as synchronized with the multimedia output, network data, and user interface data.

Synchronized Data Playback

The synchronized data created by testing apparatus 101 can be played back to recreate conditions that were present in a testing mode. Playback can be done in real-time, frame by frame, or at some other rate. For automation purposes, while playback is happening, testing apparatus 101 can record the outputs of the device under test to form another set of testing data. Testing apparatus 101 can run a game program during a testing session, recording all input and output activity during the testing session. Then, the testing session can be fully reproduced by reenacting the session using the recorded data. The data is run on a system with the game program in a synchronized manner to properly simulate the session. Thus, tests can be run afterwards without a user, whether the user is human or simulated.

In operation, an erroneous event can occur while a game is operated and all of its inputs and outputs are recorded, including all extraneous events occurring possibly in other systems by other users or entities. The event can then be reproduced fully by playing the game again with the same exact inputs and outputs that occurred throughout the system or systems in which the game was played. The recording of the event can possibly be sent to a developer or other technical support person, and the event can be recreated for testing.

In some embodiments, the recorded data can be edited. One use of editing the data is to take into account updates or other changes in the application on the device under test. This would be helpful, so that users would not have to replay and record a session over again to recreate the same test scenario for validation with an updated device.

Other Variations

Embodiments of a user interface process and apparatus, as well as a game programmed according to the use of such user interfaces, according to aspects of the present invention are described herein. It should be understood that many variations from what is described can be easily derived from reading this detailed description. Thus, while embodiments are described with reference to particular examples, it should be understood that, while specific details are described by example, the invention is not limited to specific examples.

For example, different methods of recording and replaying human testing user actions might be provided. In some embodiments, instead of replaying a session by applying the record inputs to the device under test and observing the outputs, the recorded inputs and recorded outputs could be viewed directly during an analysis process and the device under test is not needed.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A computerized testing apparatus for testing a computerized application executing on a device under test, the computerized testing apparatus comprising:
    a user input means for receiving human testing user inputs, wherein the human testing user inputs are not determinable in advance by the computerized testing apparatus;
    a device output means for conveying the human testing user inputs to the device under test;
    a device input means for receiving device sensory outputs from the device under test;
    a user output means for conveying the device sensory outputs to user output devices;
    a recording module for recording human testing user inputs, nondeterministic variables, the nondeterministic variables being generated by an event not necessarily determined by user inputs, and device sensory outputs such that inputs, nondeterministic variables, and outputs are time-referenced to enable synchronization between inputs and outputs, wherein at least one of the nondeterministic variables is operable to alter the flow of the computerized application; and
    storage for synchronized recorded inputs, nondeterministic variables, and outputs.

2. The computerized testing apparatus of claim 1, further comprising:
    a computer device input means for receiving nonsensory outputs from the device under test; and
    a computer device output means for conveying the nonsensory outputs to devices coupled to the computerized testing apparatus.

3. The computerized testing apparatus of claim 1, wherein the user output means comprise audio output devices, video output devices, and tactile output devices.

4. The computerized testing apparatus of claim 1, wherein the device under test is a hardware device executing an application under test.

5. The computerized testing apparatus of claim 4, wherein the application under test is an interactive video game.

6. The computerized testing apparatus of claim 4, wherein the application under test is a flight simulator.

7. The computerized testing apparatus of claim 1, wherein the recording module is configured to associate recorded data with timestamps representing times of capture of the user inputs and the device inputs.

8. A method of testing a game device during a session of game operation by a user using a computerized testing apparatus, the method comprising:
    receiving and storing human testing user inputs and nondeterministic variables in a time-referenced manner, wherein the human testing user inputs are not determinable in advance by the computerized testing apparatus and the nondeterministic variables are generated by an event not necessarily determined by user inputs;
    receiving and storing device sensory outputs from the device under test in a time-referenced manner; and
    reproducing the session by replaying the stored inputs, nondeterministic variables, and outputs according to the time references and without necessarily accessing the device under test, wherein the nondeterministic variables are such that at least one of the nondeterministic variables is operable to alter the flow of the game operation.

9. The method of claim 8, wherein reproducing the session includes playing back the input and output data in a synchronized manner.

10. The method of claim 9, wherein the data is played back frame-by-frame.

11. A method of analyzing a game application test, the game application being executed during a testing session between a human testing user and a computerized testing apparatus, the method comprising:
    producing nonsensory output signaling to provide testing session control and debug input, the nonsensory output signaling provided when a device under test is coupled to the computerized testing apparatus;
    recording human testing user input data being generated as user output signaling from a user input means being manipulated by the human testing user during the testing session;
    recording computer testing apparatus output signaling provided as sensory output data being produced by the game application tested as the game application is executed with the computer testing apparatus, the testing session is played between the human testing user and the device under test being accessed by the computer testing apparatus;
    synchronously viewing the recorded human testing user input data and the recorded sensory output data corresponding to the computer testing apparatus execution of the game application; and
    analyzing the game application test whereby the recorded human testing user input data is associated with the recorded sensory output data during at least one instance of the step of viewing and is compared with a predetermined expectation of sensory output data, the analyzing being accomplished without necessarily accessing the device under test.

12. A computerized testing apparatus for testing a computerized application executing on a device under test, the computerized testing apparatus comprising:
    a user input means for receiving human testing user inputs, wherein the human testing user inputs are not determinable in advance by the computerized testing apparatus;
    a device output means for conveying the human testing user inputs to the device under test;
    a device input means for receiving device sensory outputs from the device under test;
    a user output means for conveying the device sensory outputs to user output devices;
    a network input means configured to be coupled to a network, to receive further human testing user inputs and nondeterministic variables, and to provide device sensory outputs to the network, wherein the nondeterministic variables are generated by an event not necessarily determined by user inputs;

a recording module for recording human testing user inputs, the nondeterministic variables, and device sensory outputs such that inputs, nondeterministic variables, and outputs are time-referenced to enable synchronization between inputs and outputs, wherein at least one of the nondeterministic variables is operable to alter the flow of the computerized application; and storage for synchronized recorded inputs, nondeterministic variables, and outputs.

13. The computerized testing apparatus of claim 12, further comprising:

a computer device input means for receiving nonsensory outputs from the device under test; and a computer device output means for conveying the nonsensory outputs to devices coupled to the computerized testing apparatus.

14. The computerized testing apparatus of claim 12, wherein the user output means comprise audio output devices, video output devices, and tactile output devices.

15. The computerized testing apparatus of claim 12, wherein the device under test is a hardware device executing an application under test.

16. The computerized testing apparatus of claim 15, wherein the application under test is an interactive video game.

17. The computerized testing apparatus of claim 15, wherein the application under test is a flight simulator.

18. The computerized testing apparatus of claim 12, wherein the recording module is configured to associate recorded data with timestamps representing times of capture of the user inputs and the device inputs.

19. A method of testing a game device during a networked session of game operation by a user using a computerized testing apparatus, the method comprising:

receiving and storing human testing user inputs and nondeterministic variables in a time-referenced manner, wherein the human testing user inputs are not determinable in advance by the computerized testing apparatus and the nondeterministic variables are generated by an event not necessarily determined by user inputs, wherein at least a portion of the human testing user inputs and nondeterministic variables are received from a network, wherein the nondeterministic variables are such that at least one of the nondeterministic variables is operable to alter the flow of the game operation;

receiving and storing device sensory outputs from the device under test in a time-referenced manner; and reproducing the session by replaying the stored inputs, nondeterministic variables, and outputs according to the time references and without necessarily accessing the device under test, wherein at least a portion of the stored inputs, nondeterministic variables, and outputs are provided to the network.

20. The method of claim 19, wherein reproducing the session includes playing back the input and output data in a synchronized manner.

21. The method of claim 20, wherein the data is played back frame-by-frame.

22. A method of analyzing a game application test, the game application being executed during a testing session between a human testing user and a computerized testing apparatus, the method comprising:

producing nonsensory output signaling to provide testing session control and debug input, the nonsensory output signaling provided when a device under test is coupled to the computerized testing apparatus and a network;

recording human testing user input data being generated as user output signaling from a user input means being manipulated by the human testing user or received as user output signaling over the network during the testing session;

recording computer testing apparatus output signaling provided as sensory output data being produced by the game application tested as the game application is executed with the computer testing apparatus, the testing session is played between the human testing user and the device under test being accessed by the computer testing apparatus;

synchronously viewing the recorded human testing user input data and the recorded sensory output data corresponding to the computer testing apparatus execution of the game application; and analyzing the game application test whereby the recorded human testing user input data is associated with the recorded sensory output data during at least one instance of the step of viewing and is compared with a predetermined expectation of sensory output data, the analyzing being accomplished without necessarily accessing the device under test.

* * * * *

UNITED STATES PATENT AND TRADEMARK OFFICE
CERTIFICATE OF CORRECTION

PATENT NO. : 7,587,637 B2  Page 1 of 1
APPLICATION NO. : 11/123722
DATED : September 8, 2009
INVENTOR(S) : Behrang Garakani It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 835 days.

Signed and Sealed this

Twenty-first Day of September, 2010

David J. Kappos
*Director of the United States Patent and Trademark Office*